Feb. 16, 1943.  C. A. BICKEL  2,311,203
TAPER ATTACHMENT CONSTRUCTION
Filed June 10, 1940  4 Sheets-Sheet 2
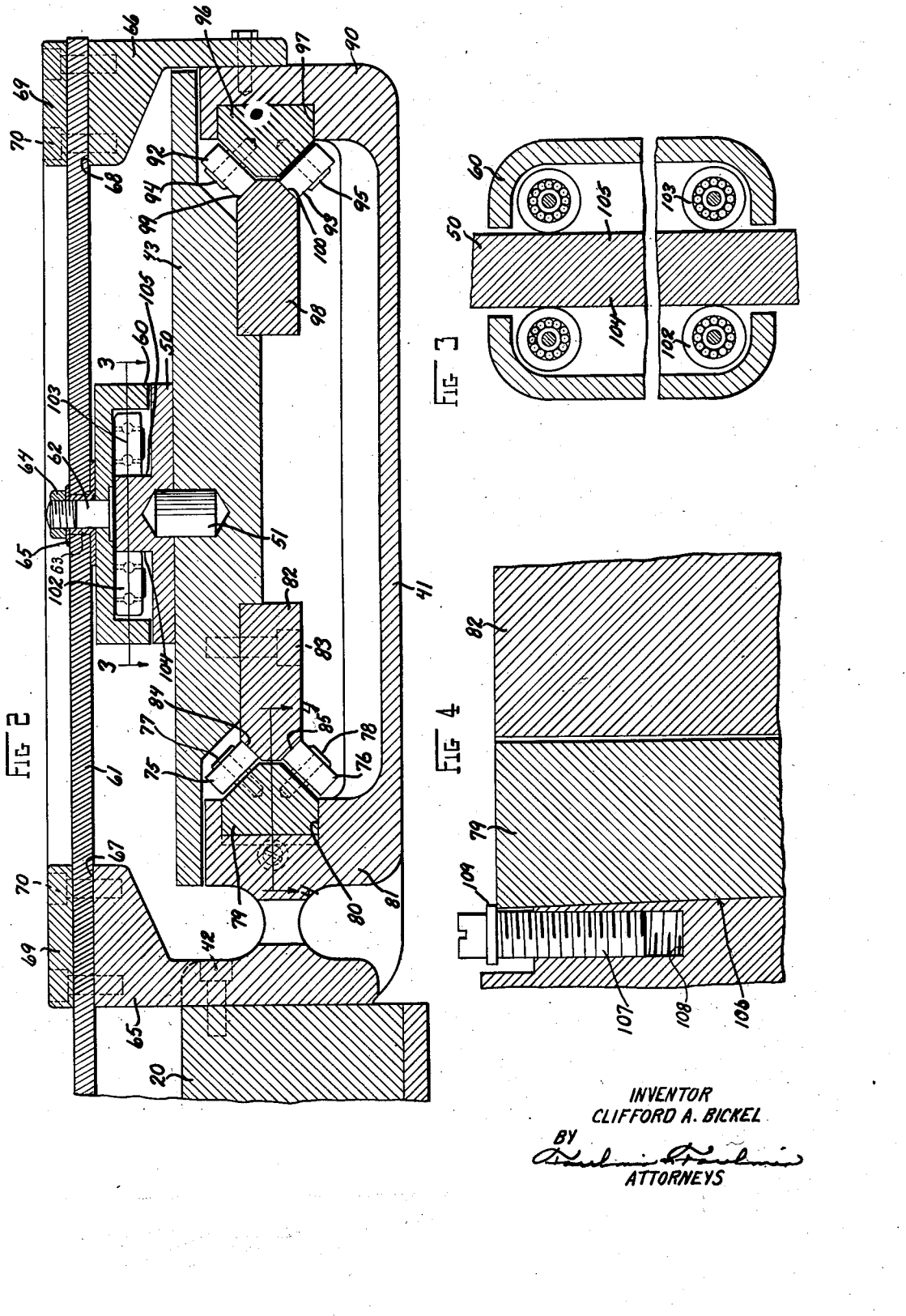
INVENTOR
CLIFFORD A. BICKEL
BY
ATTORNEYS Feb. 16, 1943. C. A. BICKEL 2,311,203
TAPER ATTACHMENT CONSTRUCTION
Filed June 10, 1940 4 Sheets-Sheet 3
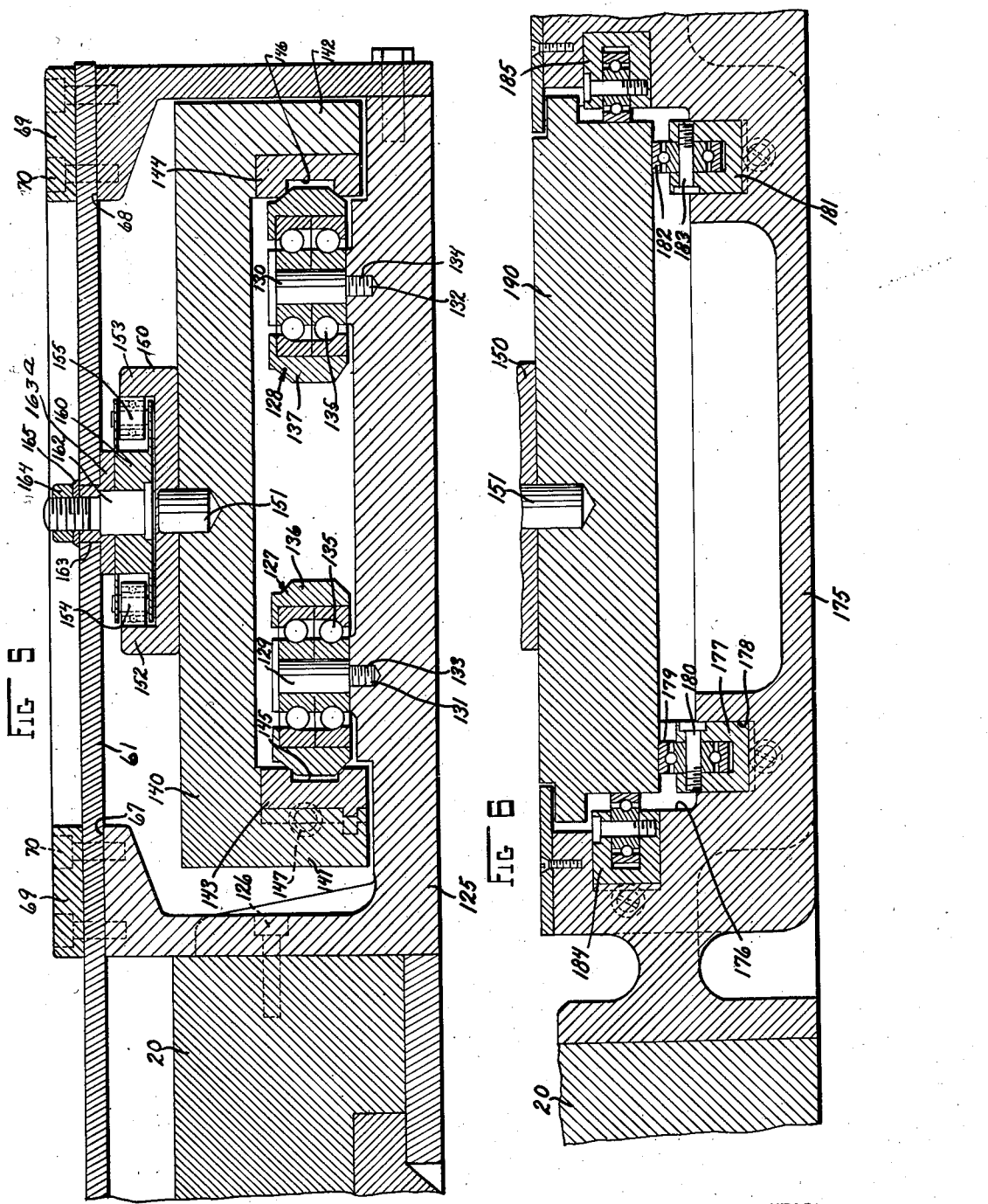
INVENTOR
CLIFFORD A. BICKEL
BY
ATTORNEYS

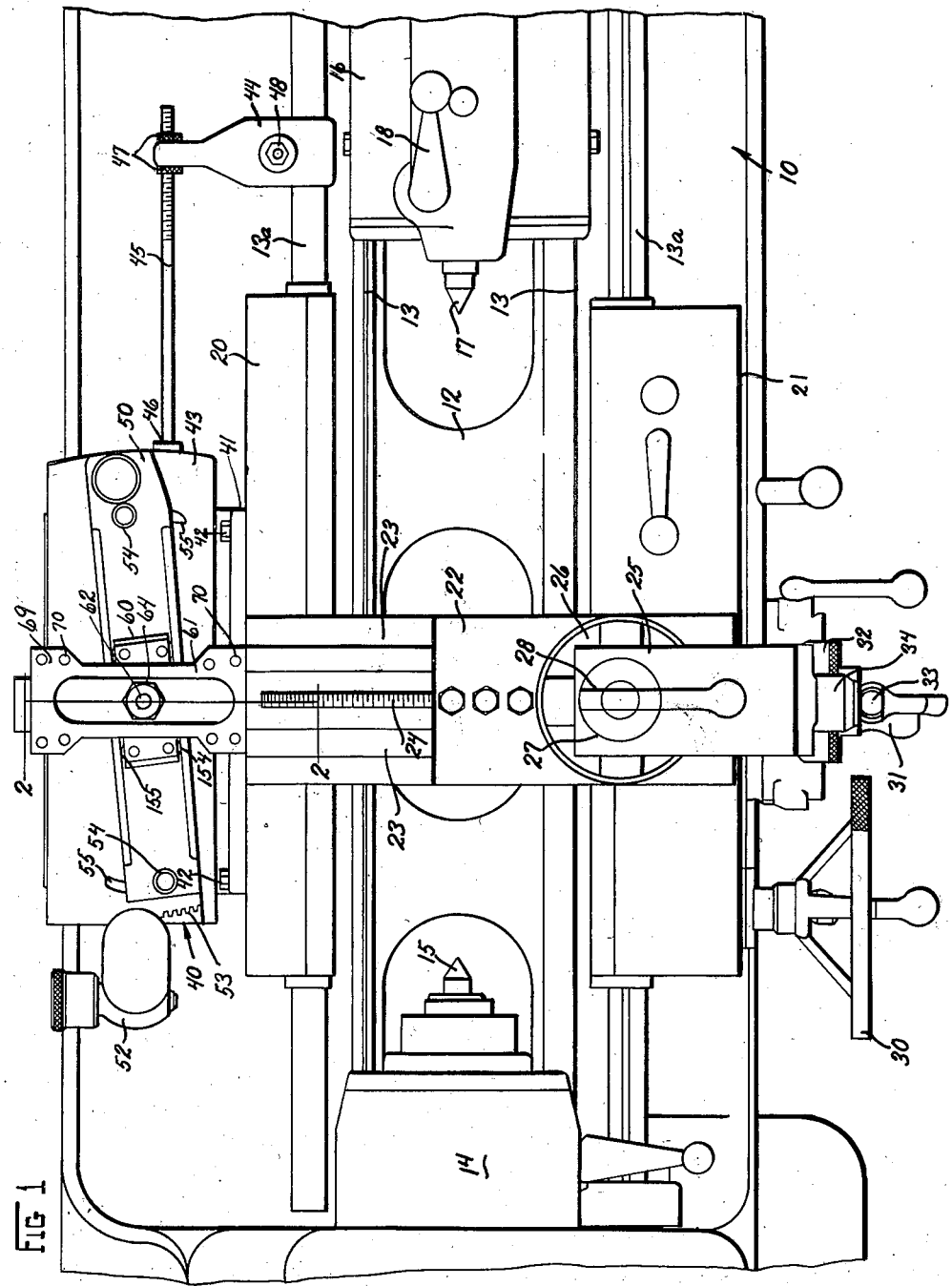

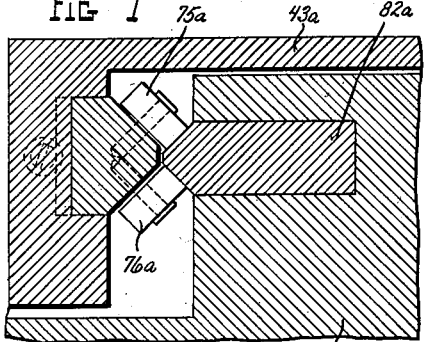
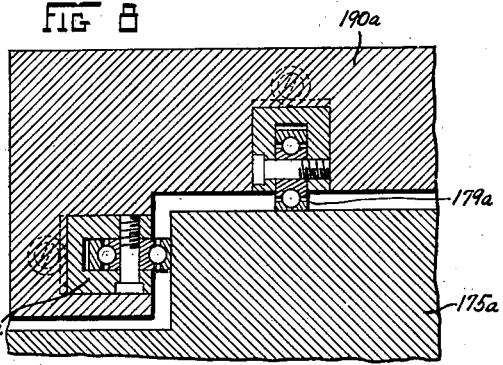
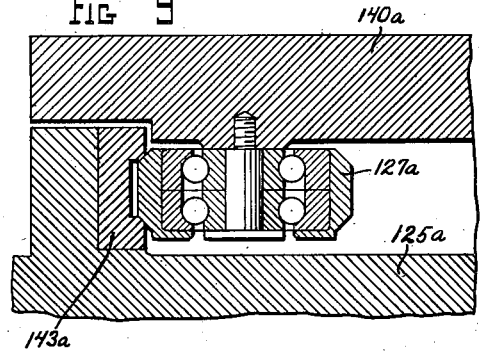
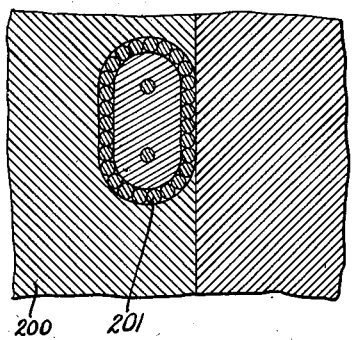
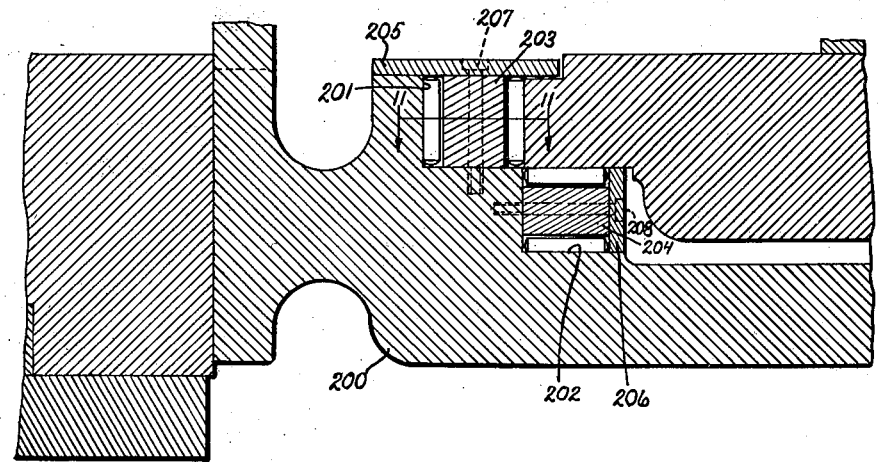

Patented Feb. 16, 1943

2,311,203

UNITED STATES PATENT OFFICE 2,311,203

TAPER ATTACHMENT CONSTRUCTION

Clifford A. Bickel, Sidney, Ohio, assignor to The Monarch Machine Tool Co., Sidney, Ohio, a corporation of Ohio Application June 10, 1940, Serial No. 339,685

2 Claims. (Cl. 82—17)

This invention relates to taper cutting devices which are to be positioned on a lathe or other turning machines.

An object of the invention is to provide a taper cutting apparatus wherein the friction of the thrust transmitted through the device is reduced to a minimum to permit accurate cutting of tapers on a workpiece.

Another object of the invention is to provide a plurality of anti-friction devices positioned between adjacent cooperating surfaces each of which consists of a plurality of rotary bearing elements and which are so positioned to prevent or reduce friction to a minimum between the cooperating sliding surfaces which guide the movement of the movable members of the taper cutting device.

Another object of the invention is to provide a plurality of anti-friction bearing devices having angularly positioned bearing faces which cooperate with guide members to position a movable slide member upon a stationary carriage bracket both vertically and laterally.

A still further object of the invention is to provide an arrangement of anti-friction bearing elements between a sliding member and a stationary member whereby the bearing elements will position the sliding member upon the stationary member and will assume any thrust caused upon the sliding member.

A still further object of the invention is to position a plurality of anti-friction devices, comprising a plurality of rotary bearing elements, between a movable member and a stationary carriage in such a manner that the anti-friction devices are adjustable to alter a horizontal plane of the sliding member upon the stationary member and to position this plane vertically and laterally with respect to the stationary member.

Another object of the invention is to provide a plurality of anti-friction bearing devices between adjacent parallel sliding surfaces which devices consist of a race filled with a plurality of needle bearings.

Further objects and advantages will be apparent from the description and the drawings which follow.

In the drawings:

Figure 1 is a top elevational plan view of a turning machine to which the taper cutting device of this invention has been attached.

Figure 2 is a transverse cross-sectional view taken along line 2—2 of Figure 1.

Figure 3 is a horizontal cross-sectional view taken along line 3—3 of Figure 2.

Figure 4 is a horizontal cross-sectional view taken along line 4—4 of Figure 2 and shows a portion of the carriage bracket in which an adjusting screw is positioned.

Figure 1 is a cross-sectional view similar to that of Figure 2 showing a modified arrangement of the anti-friction bearing devices.

Figure 5 is a cross-sectional view similar to that that of Figure 2 showing a still further modified form of the anti-friction bearing devices.

Figure 7 is a partial cross-sectional view of the slide and carriage bracket showing an inversion of the bearing arrangement disclosed in Figure 2.

Figure 8 is a partial cross-sectional view of the slide and carriage bracket showing an inversion of the bearing arrangement disclosed in Figure 6.

Figure 9 is a partial cross-sectional view of the slide and carriage bracket showing an inversion of the bearing arrangement disclosed in Figure 5.

Figure 10 is a partial transverse cross-sectional view of the slide and carriage bracket showing another form of an anti-friction bearing which can be positioned between the slide and carriage bracket.

Figure 11 is a partial horizontal cross-sectional view taken along line 11—11 of Figure 10.

In general, the device of this invention is a device for cutting tapers longitudinally upon a workpiece positioned within a lathe or other turning machine. The device is attached to the carriage of the lathe in such a manner that one portion, or carriage bracket of the device, moves longitudinally along the lathe bed with movement of the lathe carriage. Another portion, or the slide of the device, is adapted to be retained in a stationary position through means of an anchor bracket which is secured to the bed of the lathe. A swivel member is pivotally mounted upon the slide and is arranged so that it can be positioned at an angle with regard to the longitudinal movement of the carriage of the lathe. A shoe or follower engages the angularly positioned swivel and is caused to follow the angular path formed by the guideways of the swivel since the shoe or follower is interconnected with the carriage bracket which is secured to the lathe carriage. Since the carriage bracket and follower move relative to the swivel and slide it is seen that the shoe is capable of transmitting an angular movement simultaneously with the longitudinal movement thereof.

The shoe or follower is connected to the cross slide positioned upon the carriage of the lathe in such a manner that the transverse movement caused by movement of the shoe will be transmitted to the cross slide of the lathe and thus to the cutting tools positioned thereon.

When performing a taper cutting operation upon a workpiece positioned within the lathe considerable transverse thrust is transmitted through the shoe and swivel to the slide, thereby making it difficult for the slide and shoe to move relative to the carriage bracket and swivel. The anti-friction bearing elements positioned between the slide and the carriage bracket and between the swivel and shoe of this invention assume the friction caused by this transverse thrust, thereby providing means to permit free movement between the slide and the carriage bracket.

In this invention a lathe or turning machine 10 is provided with a bed 12 upon which ways 13 are positioned longitudinally upon the bed 12. A head stock 14 is located at one end of the bed 12 and is provided with conventional mechanism within the head stock to drive a live spindle 15. At the opposite end of the lathe 10 there is a tail stock 16 to be moved to and fro along the ways 13 to adjust the position thereof with respect to a workpiece to be positioned between the live center 15 and the dead center 17 positioned within the head stock 16. A clamping lever (not shown) is mounted upon the tail stock 16 and is adapted to clamp the tail stock 16 in position upon the ways 13; lever 18 is provided to lock the spindle and dead center 17 within the tail stock 16. The mechanism operated by the lever 18 is of any conventional type and is well known in the art.

A carriage 20 is mounted upon the ways 13a also positioned upon the upper surface of the bed 12 of the lathe 10. The carriage 20 is arranged so that it can be driven to and fro along the ways 13a by means of the usual feed rod (not shown) mounted adjacent the forward wall of the lathe 10 and connected with the driving mechanism of the lathe in conventional manner. An apron 21 depends from the forward edge of the carriage 20 and is adapted to support various controls for operation of the lathe mechanism, and particularly the controls for controlling movement of the carriage 20 and a cross slide 22. The cross slide 22 is positioned transversely upon the carriage 20 and is guided in its transverse movement by the ways 23 which provide a dovetail type sliding joint between the ways 23 and the cross slide 22. A cross feed screw 24 is positioned transversely of the carriage 20 and engages a cross feed nut (not shown) upon the cross slide 22. The cross feed screw 24 is connected to the driving mechanism of the lathe in a conventional manner for driving the cross slide 22 transversely of the carriage 20.

A compound tool rest 25 is mounted upon the cross slide 22 and is provided with the usual swivel plate 26 for permitting angular positioning of the compound tool rest 25 with respect to the cross slide 22. A tool post 27 is mounted upon the tool rest 25 and is adapted to carry a clamping means 28 which is provided for securing the tool post 27, and a tool positioned therein, upon the tool rest 25.

As heretofore mentioned suitable controls are provided upon the apron 21 depending from the carriage 20 for controlling the operations of the carriage 20 and for controlling the transverse movement of the cross slide 22. These controls may consist of a hand wheel 30 which engages the feed rack (not shown) of the lathe 10 for transporting the carriage 20 longitudinally along the ways 13a. A hand wheel 31 may be provided for manually advancing and retracting the cross slide 22 transversely upon the carriage 20. A micrometer indicating wheel 32 may be positioned in operative association with the hand wheel 31 to indicate the travel of the cross slide 22. A suitable hand wheel 33 and a micrometer indicating head 34 are provided upon the compound tool rest 25 for controlling the movement of the tool upon the rest and indicating said movement.

The cross feed screw 24 is interconnected with a taper cutting attachment 40 secured to the carriage 20 in such a manner that when the taper cutting attachment 40 is arranged to transmit an angular motion simultaneously with longitudinal movement of the carriage 20, interconnecting driving means between the taper cutting attachment 40 and the cross feed screw 24 will cause the cross feed screw to be urged transversely of the carriage 20, without causing the same to revolve. The cross feed screw 24 will thus carry the cross slide 22 transversely upon the carriage 20 simultaneously with longitudinal movement of the carriage 20.

This function of the cross feed screw in transmitting an angular motion upon the cross slide 22 with simultaneous longitudinal movement of the carriage 20, without rotation of the cross feed screw 24, requires that a telescopic driving arrangement be provided between the cross feed screw 24 and the driving mechanism for the lathe 10. This telescopic arrangement (not shown) is such that the feed rod of the lathe may drivingly engage the cross feed screw 24 to permit rotation thereof to cause transverse movement of the cross slide 22 upon the carriage 20, or when the cross feed screw 24 is disconnected from the feed rod of the lathe a sliding engagement between the cross feed screw 24 and the feed rod of the lathe is brought into action to permit the cross feed screw 24 to be moved transversely of the carriage 20 through a manually controlled push or pull upon the cross feed screw 24. These telescopic driving connections between a cross feed screw and the feed rod of the lathe, are well known in the art and further description thereof is not deemed necessary.

The taper cutting attachment 40 consists of a carriage bracket 41 which is secured to the carriage 20 by means of the bolts 42 whereby the carriage bracket 41 will be caused to move longitudinally upon the ways 13a of the lathe 10 when the carriage 20 is moved to and fro upon said lathe. A slide member 43 is positioned in sliding engagement with the carriage bracket 41 through suitable anti-friction bearing elements which will hereinafter be more fully described. The slide 43 is retained in a stationary position with respect to the bed 12 of the lathe 10 by means of an anchor bracket 44 and an anchor rod 45. The anchor rod 45 is attached to the slide 43 as at 46. The opposite end of the anchor rod 45 extends through the anchor bracket 44 and is secured thereto by means of the retaining nuts 47 which are in threaded engagement with the anchor rod 45 to permit adjustment of the rod with respect to the anchor bracket 44. The anchor bracket 44 is provided with suitable clamping means for securing the bracket to the way 13a upon the bed 12 of the lathe 10 and may consist of a binding bolt 48 which may extend through the anchor bracket 44 and engage the underside of the way 13a and bind the bracket 44 thereupon.

A swivel 50 is pivotally mounted upon the slide 43 by means of a pivot post 51 (see Figure 2), to permit the swivel 50 to be arranged angularly with respect to the axis of rotation of a workpiece positioned between the live center 15 and the dead center 17 of the lathe 10. At one end of the swivel 50 there is provided a micrometer adjusting attachment 52 which is adapted to engage a gear segment 53 positioned upon the end of the swivel 50. This micrometer adjusting device is provided for accurately controlling the angular position of the swivel 50 upon the slide 43. Binder screws 54 are provided at either end of the swivel 50 and are adapted to extend through the swivel into engagement with the slots 55 positioned in the slide 43, and are provided for retaining the swivel 50 in position after having been set by means of the micrometer adjusting device 52.

A shoe or follower 60 engages the swivel 50 and is guided thereupon in such a manner that the path of movement of the shoe 60 will be coincident with the angularity of the swivel 50. The shoe 60 is secured to a draw-bar 61 by means of a stud 62 which extends through a bushing 63 which passes through the draw-bar 61. A washer 65 is placed upon the stud 62 above the bushing 63 and the draw-bar 61. A nut 64 is in threaded engagement with the end of the stud 62. The shoe or follower 60 is thus pivotally positioned upon the draw-bar 61, and after the angularity of the swivel 50 has been set, the shoe 60 will cause a transverse movement to be transmitted through the draw-bar 61 when the shoe is moved longitudinally with respect to the swivel 50.

To provide lateral movement of the shoe 60 with respect to the swivel 50 the draw-bar 61, upon which the shoe 60 is mounted, is retained in a guided relationship upon the carriage bracket 41. Guide brackets 65 and 66 are positioned upon opposite sides of the carriage bracket 41 and are provided with guideways 67 and 68 respectively within which the draw-bar 61 is in sliding and guided engagement. A cover plate 69 is positioned adjacent the top surfaces of the brackets 65 and 66 and is retained upon the brackets by means of the bolts 70. This cover plate, in cooperation with the guideways 67 and 68 in the brackets 65 and 66 respectively, provides means for retaining the draw-bar 61 within the guideways 67 and 68.

The draw-bar 61 is connected in operative association with the cross feed screw 24 in any suitable manner whereby the cross feed screw 24 can be mounted rotatively upon the draw-bar 61, while at the same time longitudinal movement of the cross feed rod 24 with respect to the draw-bar 61 will be prevented. Many specific methods of so mounting the cross feed rod to the draw-bar could be provided and it is not believed an exact disclosure or further description of such a method is required.

In this invention the slide 43 is mounted upon the carriage bracket 41 through a plurality of anti-friction bearing devices. These devices comprise a pair of anti-friction bearing devices 75 and 76 each of which consists of a multiplicity of rotary bearing elements or ball bearings. The ball bearing anti-friction bearing device 75 is mounted upon a pin 77 and the ball bearing anti-friction bearing device 76 is mounted upon a pin 78. These pins 77 and 78 are disposed angularly with respect to each other and are mounted upon an insert or gib 79 which is positioned within a recess 80. The recess 80 extends longitudinally within a vertically extending wall 81 of the carriage bracket 41. The gib 79 is retained within the recess by suitable fastening means.

Since the ball bearing members 75 and 76 are positioned upon their rotational axes upon the pins 77 and 78 which are disposed angularly with respect to each other, it can be seen that the bearing faces of the ball bearing members 75 and 76 will be disposed angularly with respect to each other, whereby a substantially wedge shaped or V-shaped bearing surface is provided for engagement with a guide member 82 positioned upon the slide 43. The guide member 82 is secured to the slide 43 by use of suitable bolts 83. The forward faces of the guide member 82, which are adapted to engage the bearing faces of the ball bearing members 75 and 76, are arranged at the same angle of inclination as the cooperating faces of the ball bearing members 75 and 76 whereby bearing surfaces 84 and 85 are provided between the bearing members 75 and 76 respectively and their cooperating faces upon the guideway 82.

A plurality of these anti-friction bearing devices, each comprising a pair of ball bearing anti-friction devices, may be positioned longitudinally along the vertically extending wall 81 of the carriage bracket 41 and engage the guideway 82 of the slide 43, which guideway is also positioned longitudinally upon the slide 43 for engagement with the anti-friction bearing devices mounted upon the adjacent cooperating wall 81 of the carriage bracket 41.

A similar arrangement is provided along the opposite parallel wall of the slide 43 and the cooperating vertically extending wall 90 of the carriage bracket 41. The arrangement adjacent the wall 90 of the carriage bracket 41 consists of the ball bearing anti-friction devices 92 and 93 mounted upon angularly disposed bearing pins 94 and 95. These bearing pins 94 and 95 are positioned within an insert or gib 96 positioned within a recess 97 provided longitudinally within the wall 90 of the carriage bracket 41. This gib 96 may be retained in the recess 97 by any suitable fastening means. A guideway 98 secured to the slide 43 by suitable bolts is provided with angularly disposed bearing faces 99 and 100 which cooperate with the angularly disposed bearing faces of the ball bearing anti-friction devices 92 and 93. It is thus seen that the positioning of the angular positioning of the ball bearing anti-friction devices 92 and 93 provide a wedge or V-shaped bearing surface which cooperates with a wedge or V-shaped guideway surface.

By the arrangement of the wedge shaped bearing and guideway surfaces provided between the ball bearing members 75 and 76 and the cooperating guideway 82 and the ball bearing members 92 and 93 and the cooperating guideway member 98 it is seen that there is provided an arrangement whereby the slide 43 is retained in a horizontal position and directly supported by the respective ball bearing and guideway surfaces.

When operating the taper cutting attachment so as to cause movement of the shoe along the swivel 50 considerable transverse thrust is transmitted from the draw-bar 61 to the slide 43 which must be assumed by the anti-friction bearing elements positioned between the slide 43 and the vertically extending walls 81 and 90 of the carriage bracket 41. It is thus seen that the construction of the device, as heretofore disclosed, performs two functions in that the anti-friction bearing devices support the slide 43 upon an anti-friction bearing surface and also assume any transverse thrust transmitted to the slide 43 by the draw-bar 61 and divide this thrust between a plurality of anti-friction bearing devices to obtain a more freely operating slide member.

To reduce the friction caused between the shoe 60 and the swivel 50 caused by the transverse thrust of the draw-bar 61, anti-friction bearing devices 102 and 103 are provided between adjacent cooperating walls of the shoe 60 and the swivel 50. These anti-friction bearing devices 102 and 103 engage upwardly extending parallel walls 104 and 105 respectively.

To adjust the work clearance between the ball bearing anti-friction devices 75, 76, and 92, 93, and their cooperating guideways 82 and 98, the insert or gib 79 is provided with a tapered wall which cooperates with a similarly tapered wall of the recess 81, as indicated at 106. A retaining screw 107 is positioned at either end of the gib 79 and is in threaded engagement with a threaded hole 108 placed in the wall 81 and adjacent the tapered wall 106. This screw 107 has an enlarged head 109 which engages the gib 79. Adjustment of the screw 107 will cause transverse movement of the gib 79 thereby moving the anti-friction bearing devices 75 and 76 transversely against the guideway 82, thus forcing the opposite guideway 98 into engagement with the anti-friction bearing devices 92 and 93.

In Figure 5 there is shown a modified arrangement of the anti-friction bearing supports between the slide and carriage bracket of the taper turning device wherein single anti-friction bearing elements provide the means for vertically supporting the slide upon the carriage bracket and for assuming the transverse thrust of the slide. In this arrangement I provide a carriage bracket 125 which is secured to the carriage 20 of the lathe by means of suitable bolts 126. Anti-friction bearing elements 127 and 128 are mounted upon their rotative axes by means of studs 129 and 130 respectively. These studs 129 and 130 are provided with reduced end portions 131 and 132 respectively which are threaded, and are in threaded engagement with tapped holes 133 and 134 respectively, positioned in the carriage bracket 125. Each of the anti-friction bearing elements 127 and 128 consists of a multiplicity of rotary bearing elements 135. The outer race 136 of the bearing element 127 and the outer race 137 of the bearing element 128 are provided with angularly disposed bearing faces which provide a substantially wedge shaped bearing surface thereupon. A slide 140 is provided with depending walls 141 and 142 extending longitudinally of the slide 140 and in parallel relation with each other. A guideway or a gib 143 is positioned longitudinally within the wall 141 and a guideway or a gib 144 is positioned longitudinally within the wall 142 of the slide 140. The guideway 143 is provided with a recess 145 and the guideway 144 is provided with a recess 146, said guideways being positioned in such a manner that said recesses engage the wedge shaped bearing faces of the races 136 and 137 of the anti-friction bearing devices 127 and 128 respectively.

A plurality of the anti-friction bearing devices 127 and 128 may extend longitudinally of the carriage bracket 125 and adjacent the depending walls 141 and 142 of the slide 140 whereby a plurality of bearing elements are provided to support the slide 140 in a vertical position with respect to the carriage bracket 125 and to assume any transverse thrust transmitted through the slide 140. The guideway or gib 143 is adjustable in the same manner as the gib 79, disclosed in Figure 2, by means of a screw 147.

A swivel 150 is pivotally mounted upon the slide 140 by means of a pin 151 and is provided with upwardly extending walls 152 and 153 which engage anti-friction bearing elements 154 and 155 respectively, suitably mounted upon a shoe or follower 160. The shoe or follower 160 is secured to the draw-bar 61 by means of a pin 162 extending through a bushing 163a upon which a washer 165 is mounted adjacent the slot 163 and is retained thereon by means of a nut 164 in threaded engagement with the end of the pin 162.

By the use of this arrangement a single anti-friction bearing element, comprising a multiplicity of rotary bearing elements, can be used to vertically position a slide with respect to a carriage bracket and assume the transverse thrust of the carriage bracket.

In Figure 6, there is shown another modified arrangement of the positioning of anti-friction bearing devices, each comprising a multiplicity of rotary bearing elements, wherein the bearing devices can be adjusted to permit vertical adjustment of the horizontal plane of a slide with respect to a carriage bracket and wherein lateral adjustment may also be accomplished.

In this arrangement I provide a carriage bracket 175 which can be suitably mounted to the carriage 20 of the lathe 10. The carriage bracket 175 is provided with a recess 176 extending longitudinally within the same. An insert or gib 177 is positioned within a recess 178 provided in the bottom wall of the recess 176, and which extends longitudinally of the carriage bracket 175 and adjacent to and parallel with the vertical wall of the recess 176. Anti-friction bearing devices 179 are mounted upon the gib 177 by means of bearing pins 180. A plurality of these devices may extend along the length of the gib 177. The bottom wall of the recess 178 is provided with a taper extending longitudinally of the recess and the bottom cooperating wall of the gib 177 is provided with a corresponding taper to cooperate with the bottom wall of the recess 178 in such a manner that the gib 177 may be raised or lowered within the recess 178 to adjust the vertical position of the bearing surfaces of the anti-friction bearing devices 179. This adjustment is of a construction like that disclosed in Figure 4.

A similar anti-friction bearing arrangement is provided along the opposite edge of the wall of the recess 176 and consists of an adjustable insert or gib 181 upon which an anti-friction bearing device 182 is mounted upon a bearing pin 183. This bearing device is also adjustable vertically to position the bearing face of the anti-friction bearing device 182.

A slide 190 is positioned within the recess 176 of the carriage bracket 175 and has the bottom face thereof supported upon the anti-friction bearing devices 179 and 182 respectively. These bearing devices are positioned adjacent the outer edges of the slide 190. Alteration of the vertical position of the bearing surfaces of the anti-friction bearing devices 179 and 182 will thus be caused to alter the horizontal plane of the top surface of the slide 190 whereby vertical adjustment of the slide 190 with respect to the carriage bracket 175 may be obtained.

Similarly constructed anti-friction bearing devices 184 and 185 are positioned between adjacent parallel vertical side walls of the recess in the carriage bracket 175 and the slide 190. Either or both of these anti-friction bearing devices can be made adjustable in the same manner as the anti-friction bearing devices 179 and 182, the adjustment however being in a lateral direction rather than a vertical direction, whereby the work clearance between the bearings and the side walls of the slide 190 can be adjusted, as well as providing means to laterally position the slide 190 upon the carriage bracket 175.

In Figure 7 I disclose a modified arrangement of the bearing support, as disclosed in Figure 2, wherein the anti-friction bearing devices 75a and 76a are mounted upon the slide 43a rather than on the carriage bracket as disclosed in Figure 2.

The guideway 82a used in this arrangement is positioned upon the carriage bracket 41a rather than upon the slide as disclosed in Figure 2. This arrangement is thus an inverted position of the bearing elements with respect to the slide and the carriage bracket. However, the functon of the anti-friction bearing device is the same as disclosed in Figure 2, the arrangement of this modification showing however, a manner whereby the transverse thrust of the slide 43a may be inwardly against the carriage bracket 41a rather than outwardly, as disclosed in Figure 2.

Figure 8 shows a modified arrangement of the bearing elements as disclosed in Figure 6 wherein the anti-friction bearing devices 179a and 184a are positioned upon the slide 190a rather than upon the carriage bracket 175a whereby the adjustable devices are positioned in the slide 190a rather than in the carriage bracket 175a, as disclosed in Figure 6.

Figure 9 is a modified arrangement of the bearing position disclosed in Figure 5 wherein the anti-friction bearing device 127a is mounted upon the slide 140a and wherein the guideway 143a is mounted within the carriage bracket 125a. This arrangement shows an inversion of the bearing arrangement of Figure 5 wherein the bearing thrust is outward against the carriage bracket rather than inward against the bearings as disclosed in Figure 5.

In Figures 10 and 11 there is shown a modified form of an anti-friction bearing device wherein a multiplicity of needle-type bearings are used for the anti-friction bearing members. In this arrangement the carriage bracket 200 is provided with an elliptically shaped recess 201 having the axis of the ellipse positioned vertically. A similar elliptically shaped recess 202 is provided in the carriage bracket 200 and has the axis of the ellipse positioned horizontally. Elliptically shaped inserts 203 and 204 are positioned within the recess 201 and 202 respectively and are positioned with respect to the walls of the recesses to provide an elliptically shaped passageway, the outer face of which will provide an outer race for a multiplicity of needle bearings while the inner face will provide the inner race for a multiplicity of needle bearings. A plurality of small diameter rods are positioned vertically or horizontally within the respective passageways and are closely adjacent each other whereby a continuous, or substantially continuous, bearing surface can be provided adjacent a face of the passageway against which a movable surface may be frictionlessly guided. Cover plates 205 and 206 enclose the needle bearings within the passageways formed by the recesses 201 and 202 respectively, the plates being secured to the carriage bracket 200 by means of bolts 207 and 208.

The construction of the frictionless bearing surface between the movable bearing surfaces of a slide and a carriage bracket provide means whereby the transverse operating thrust caused by operation of the device, and transmitted through the device to the bearing surfaces, can be assumed, and the slide member be caused to frictionlessly slide within the carriage bracket when the taper cutting device is in operation upon a lathe or other turning machine. The degree of transverse thrust transmitted by the draw-bar 61 through the shoe 60 and swivel 50 to the slide 43 increases tremendously as the angle of inclination of the swivel is increased with respect to the axis of rotation of the workpiece in order to cut steep tapers. Thus, the thrust can become so great as to bind the moving parts of the taper cutting device that it is, therefore, imperative that the friction between the moving parts be reduced to a minimum. By dividing the friction between various bearing surfaces each bearing surface will be caused to assume less friction, thereby providing an arrangement which will slide more freely.

It will be understood that I desire to comprehend within my invention such modifications as come within the scope of the claims and the invention.

Having thus fully described my invention, what I claim as new and desired to secure by Letters Patent, is:

1. In a machine tool, a carriage bracket, a slide adapted to be moved longitudinally with respect to said carriage bracket and slidably guided thereon, and anti-friction bearing devices interposed between adjacent parallel surfaces of said slide and said carriage bracket including an outer race formed by said slide and bracket, an inner race, and a multiplicity of needle bearings between said races said carriage bracket having an elliptical recess and an elliptically shaped insert inserted in said recess, the axes of said ellipses being in a vertical plane, said carriage further having a second elliptical recess and a second elliptical insert in said recess, said last named recess and insert being in a horizontal plane, the spaces formed between each recess and insert forming raceways for said bearing devices.

2. In a machine tool, a carriage bracket, a slide adapted to be moved longitudinally with respect to said carriage bracket and slidably guided thereon, and anti-friction bearing devices interposed between adjacent parallel surfaces of said slide and said carriage bracket including an outer race formed by said slide and bracket, an inner race, and a multiplicity of needle bearings between said races, said carriage bracket having an elliptical recess and an elliptically shaped insert inserted in said recess, the axes of said ellipses being in a vertical plane, said carriage further having a second elliptical recess and a second elliptical insert in said recess, said last named recess and insert being in a horizontal plane, the spaces formed between each recess and insert forming raceways for said bearing devices, and a cover for said first recess for enclosing said bearing devices, said cover having a flange forming a hold-down plate for said slide,

CLIFFORD A. BICKEL.